(12) United States Patent
Hessling

(10) Patent No.: US 6,814,331 B2
(45) Date of Patent: Nov. 9, 2004

(54) DEVICE FOR REMOVABLY FASTENING A FIRST PART TO A SECOND PART MOUNTABLE IN AN AIRCRAFT

(75) Inventor: André Hessling, Lippstadt (DE)

(73) Assignee: Goodrich Hella Aerospace Lighting Systems GmbH, Lippstadt (DE)

( * ) Notice: Subject to any disclaimer, the term of this patent is extended or adjusted under 35 U.S.C. 154(b) by 0 days.

(21) Appl. No.: 10/434,155

(22) Filed: May 9, 2003

(65) Prior Publication Data

US 2003/0209632 A1 Nov. 13, 2003

Related U.S. Application Data

(60) Provisional application No. 60/378,939, filed on May 10, 2002.

(30) Foreign Application Priority Data

May 10, 2002 (DE) .......................... 102 20 808

(51) Int. Cl.⁷ ................................. B64C 1/10
(52) U.S. Cl. ....................................... 244/119
(58) Field of Search .............................. 244/119, 118.1, 244/118.2, 118.5, 118.6, 129.1, 129.4, 133; 403/111, 124, 132, 265, 33, 65, 52, 75

(56) References Cited

U.S. PATENT DOCUMENTS

| | | | | |
|---|---|---|---|---|
| 2,827,251 A | * | 3/1958 | Doman ........................ | 244/119 |
| 2,877,970 A | * | 3/1959 | Miller et al. ................. | 244/119 |
| 3,463,424 A | * | 8/1969 | Pickell ........................ | 244/131 |
| 4,050,208 A | * | 9/1977 | Pompei et al. ................ | 52/460 |
| 4,475,752 A | * | 10/1984 | McKenna ..................... | 292/210 |
| 4,591,204 A | | 5/1986 | Gallitzendoerfer et al. | |
| 5,598,997 A | * | 2/1997 | Marquardt ............. | 248/225.21 |
| 5,687,929 A | * | 11/1997 | Hart et al. ................ | 244/118.1 |
| 5,740,846 A | * | 4/1998 | Larson et al. ................ | 141/382 |
| 5,924,649 A | * | 7/1999 | Piening et al. .............. | 244/123 |
| 5,961,072 A | * | 10/1999 | Bodle ........................ | 244/118.5 |
| 6,199,798 B1 | * | 3/2001 | Stephan et al. .......... | 244/129.4 |
| 6,276,634 B1 | * | 8/2001 | Bodle ........................ | 244/118.5 |
| 6,554,225 B1 | * | 4/2003 | Anast et al. ............. | 244/117 R |
| 6,655,635 B2 | * | 12/2003 | Maury et al. ................ | 244/131 |
| 2001/0038057 A1 | * | 11/2001 | Palm .......................... | 244/119 |
| 2002/0175244 A1 | * | 11/2002 | Burrows et al. ......... | 244/118.1 |
| 2003/0071172 A1 | * | 4/2003 | Harasta ...................... | 244/119 |
| 2003/0080247 A1 | * | 5/2003 | Frazier .................... | 244/118.1 |
| 2003/0089825 A1 | * | 5/2003 | Hessling et al. ............ | 244/119 |
| 2003/0209632 A1 | * | 11/2003 | Hessling .................... | 244/119 |

FOREIGN PATENT DOCUMENTS

| | | |
|---|---|---|
| DE | G 91 10 175.1 | 10/1991 |
| DE | 197 30 269 A1 | 1/1999 |
| DE | 100 63 035 A1 | 6/2002 |
| JP | 2002067856 | 3/2002 |
| WO | WO 00/40436 | 7/2000 |

* cited by examiner

Primary Examiner—Michael J. Carone
Assistant Examiner—Stephen A Holzen
(74) Attorney, Agent, or Firm—Birch, Stewart, Kolasch & Birch, LLP

(57) ABSTRACT

The device (10) serves for removably fastening a first part, particularly a covering element, to a second part installed in a vehicle and particularly in an airplane. The device is provided with a fastening element (18) having a first end (24) for attachment to the first part and a second end (36) for attachment to the second part. The second end (36) of the fastening element (18) is provided with an abutment portion (38) for abutment on the second leg (64) and the support element (78) of the second part, a locking portion (46) to be locked to the free end of the second leg (64) of the second part, the locking portion (46) being flexible and adapted to be moved, while generating a restoring force, from a locking position into a release position, and an actuating portion (56) for manually moving the locking portion (46) from the locking position to the release position thereof, and a grip-around portion (42) for gripping around the second part in the transition region of the two legs (62,64).

8 Claims, 4 Drawing Sheets

DEVICE FOR REMOVABLY FASTENING A FIRST PART TO A SECOND PART MOUNTABLE IN AN AIRCRAFT

This application claims priority on provisional Application No. 60/378,939 filed on May 10, 2002, and claims priority under 35 U.S.C. §119(a) on Patent Application No(s). 102 20 808.5 filed in GERMANY on May 10, 2002, which is (are) herein incorporated by reference.

BACKGROUND OF THE INVENTION

FIELD OF THE INVENTION

The invention relates to a device for removably fastening a first part, which is particularly a covering element, to a second part installed in a vehicle and particularly in an airplane. This second part comprises an L-shaped element and a support element arranged substantially flush with the shorter leg of the L-shaped element and spaced from the L-shaped element. Particularly, the second part is a C-shaped fastening profile comprising a base leg and two side legs having their free ends oriented towards each other.

In an airplane, the covering elements or functional panels (also referred to as passenger service units—PSU) arranged above the seats are fastened by use of special fastening elements to fixed C-shaped profiled rails arranged in the airplane. These rails comprise a base leg having two mutually spaced side legs extending therefrom at an angle of 900 and in parallel to each other. On the free ends of the side legs, the latter are deflected to face each other, resulting in a substantially C-shaped structure when viewed in cross section.

Fastening elements for attachment of covering elements and functional panels to a rail system as described above are known e.g. from DE-A-197 30 269.6 DE-A-100 63 035.9; WO-A-00/40436; WO 0040436A; DE 197 30 269 A; U.S. Pat. No. 4,591,204 A; JP 2002/067856; and DE 91 10 175 U1.

In the known fastening systems, use is made throughout of metal elements so as to guarantee an attachment which is safe from undesired movements in the direction of the rails. In an airplane, however, a large number of such fastening elements are used (up to 2,000 pieces depending on the type of the airplane). As a consequence, the mounting of the fastening elements should be performed relatively quickly and reliably. Apart from that, the weight aspect is of eminent importance in an airplane.

It is an object of the invention to provide a fastening system to be used particularly in airplanes which is of a light weight and can be mounted and dismounted at a reduced time.

SUMMARY OF THE INVENTION

For achieving the above object, there is proposed according to the invention a device for removably fastening a first part, particularly a covering element, to a second part installed in a vehicle and particularly in an airplane and comprising an L-shaped element including a first leg and a second leg extending therefrom substantially at a right angle and having a free end, and comprising a support element arranged in the extension of the second leg and at a distance from the free end of the second leg. The second part is particularly a C-shaped mounting profile.

According to the invention, the device for fastening a first part to a second part of the above described type comprises a fastening element having a first end for attachment to the first part and a second end for attachment to the second part, wherein the second end of the fastening element is provided with an abutment portion for abutment on the second leg and the support element of the second part, a locking portion to be locked to the free end of the second leg of the second part, the locking portion being flexible and adapted to be moved, while generating a restoring force, from a locking position into a release position, an actuating portion for manually moving the locking portion from the locking position to the release position thereof, and a grip-around portion for gripping around the second part in the transition region of the two legs.

The device according to the invention comprises a fastening element which is of a one-pieced configuration. This fastening element is preferably made from plastic while particularly a thermoplastic material will be useful. The production of the fastening element is performed through injection-molding technology.

The fastening element is provided with a restorable locking portion which, when in its rest position, assumes a locking position and can be moved into a release position while generating a restoring force particularly by elastic deformation. The locking portion has a locking projection gripping around the free end of the second leg of the L-shaped element of the second part, while a grip-around portion is arranged to abut the (outer) side, facing away from the second leg, of the first leg of the L-shaped element. The fastening element is further provided with an abutment portion provided to abut both on the second leg of the L-shaped element and on the support element of the second part. Thus, the abutment portion bridges the region between the L-shaped element and the abutment element of the fixed second part. This abutment serves for protection from twisting and thus provides for a positionally stable abutment of the fastening element to the second part in the locked condition.

To make it possible to transfer the locking portion from its locking position to the release position, the fastening element of the inventive device is provided with an actuating portion. This actuating portion is preferably arranged in the extension of the locking portion.

The handling of the fastening element of the inventive device is as simple as reasonably conceivable since it is merely required to introduce the fastening element by its locking portion between the L-shaped element and the support element of the fixed second part where, after complete insertion, it will be automatically locked to the second part. This locking can be acoustically verified so that the operating person will receive a confirmation that the fastening element has reached its locking condition. When mounting the fastening element, the L-shaped element will be confined on both sides, i.e. on one side by the locking portion and on the other side by the grip-around portion. With the fastening element fully inserted, the abutment portion is in abutment on those sides of the L-shaped element and the support element of the fixed second part which are facing towards the abutment portion. This abutment is suitably effected under (slight) elastic deformation of the abutment portion, which is of advantage under the aspects of a compensation for tolerances and particularly variations of thickness as well as oblique orientations of the fastening profile (of the second part).

According to an advantageous modification of the invention, it is provided that the locking portion is connected via a holding portion to the abutment portion of the fastening element. This holding portion extends from the abutment portion and in the mounted condition of the fastening element is arranged between the L-shaped element and the support element of the second part. The actuating portion is formed as an extension of the locking portion and arranged to project beyond the abutment portion. The connection region of the locking portion to the holding portion is thus located at a distance from the abutment portion (notably by the holding portion). The connection between the holding portion and the locking portion is flexible and adapted for torsional deflection, respectively, so that the restoring forces biasing the locking portion into its locking position will be generated when the locking portion is moved into the release position.

According to an advantageous modification of the invention, it is further provided that the grip-around portion extends from the abutment portion and that, particularly, the abutment portion, at a position opposite the grip-around portion or near the grip-around portion, has a web portion extending there-from which is arranged to face away from the grip-around portion, with the free end of the web portion being connectable to the first part and particularly forming the first end of the fastening element. According to the present modification of the invention, the grip-around portion is rigidly connected to the abutment portion. Likewise rigidly connected to the abutment portion is the web portion which forms the connection to the first part.

Preferably, the fastening element of the inventive device comprises two web-like abutment portions, each of them having a grip-around portion and a holding portion extending therefrom; between adjacent abutment portions and holding portions, the locking portion is arranged which can be moved about a (virtual) pivoting axis and is integrally connected to the holding portions. Both abutment portions suitably have a web portion extending therefrom, and the parallel web portions are partially connected to each other, thus increasing the stability and also saving material.

As already mentioned above, the inventive device is distinguished by its simple construction and its easy handling during the mounting and dismounting processes. As a result, the costs for production and assembly alike are low. While an undesired detachment of the fastening element from the second part is precluded by positive engagement (the locking portion or the locking hook grips behind the L-shaped element of the second part - undercut principle), the fastening element is on the second part secured along the extension thereof only through frictional engagement to preclude undesired movements. Such undesired movements are generally not allowable in airplane-covering elements or functional panels (PSUs) arranged above the seats since these elements must be secured against movements in flight direction (so called X-stop). The inventive fastening element should thus be used in ceiling coverings in which some covering elements are attached by the inventive device and the other covering elements are attached by the fastening system with X-stop. Therefore, the inventive device is particularly suited for the attachment of the so-called in-fill panels and $O_2$ panels above the airplane seats. Notably, depending on the spacing between the seat rows, the interspace between adjacent PSU or 02 panels has to be filled by one or several identical or different in-fill panels. For this purpose, the PSU and $O_2$ functional panels are attached by means of fastening elements which will also guarantee a reliably safe securement in flight direction. If, then, adjacent to the PSU and $O_2$ functional panels, the in-fill panels are fixed by use of the inventive device, the PSU and $O_2$ functional panels will, as it were, take over the X-stop function so that the fill-in panel attachments do not necessarily have to assume this function themselves anymore.

Further, the inventive device can be used e.g. for one or a plurality of fastening profiles of the PSU and $O_2$ functional panels so that the rest of the fastening profiles of these functional panels should be provided with the X-stop function.

Of course, the invention is not limited to uses in attaching the in-fill panels in airplanes. Instead, the inventive device is useful for basically all covering elements or other elements in vehicles. Thus, the invention is of a general applicability.

The advantages of the inventive device can be summarized as follows:

The fastening element according to the inventive device can be produced as one (injection-molded) member and does not comprise any further mechanical components and particularly no moveably supported components.

When plastics are used, the fastening element can be given an extremely light weight and be produced at low cost.

Already during the mounting, the worker will receive an acoustic conformation as a verification that the fastening element has been locked to the second part.

By simple manipulation of the actuating element (e.g. using a screw driver or the like hand-operated tool), the locking state can be released in a well-aimed manner and the fastening element can thus be dismounted.

The self-locking mechanism of the fastening element will also function in case of variations of the wall thickness caused by tolerances and in case of an oblique orientation of the second part.

When mounting the fastening element, the protective surfaces of the elements of the second part will not be damaged because the locking portion will move easily along the L-shaped element of the second part.

By selection of suitable plastics and particularly by the use of thermoplastic materials for the fastening element (and by use of metals for the second part), high reliability and longevity of the locking mechanism will be obtained.

BRIEF DESCRIPTION OF THE DRAWINGS

The invention will be described hereunder in greater detail with reference to the drawings. In the drawings.

DETAILED DESCRIPTION OF PREFERRED EMBODIMENTS OF THE INVENTION

Figure 1:
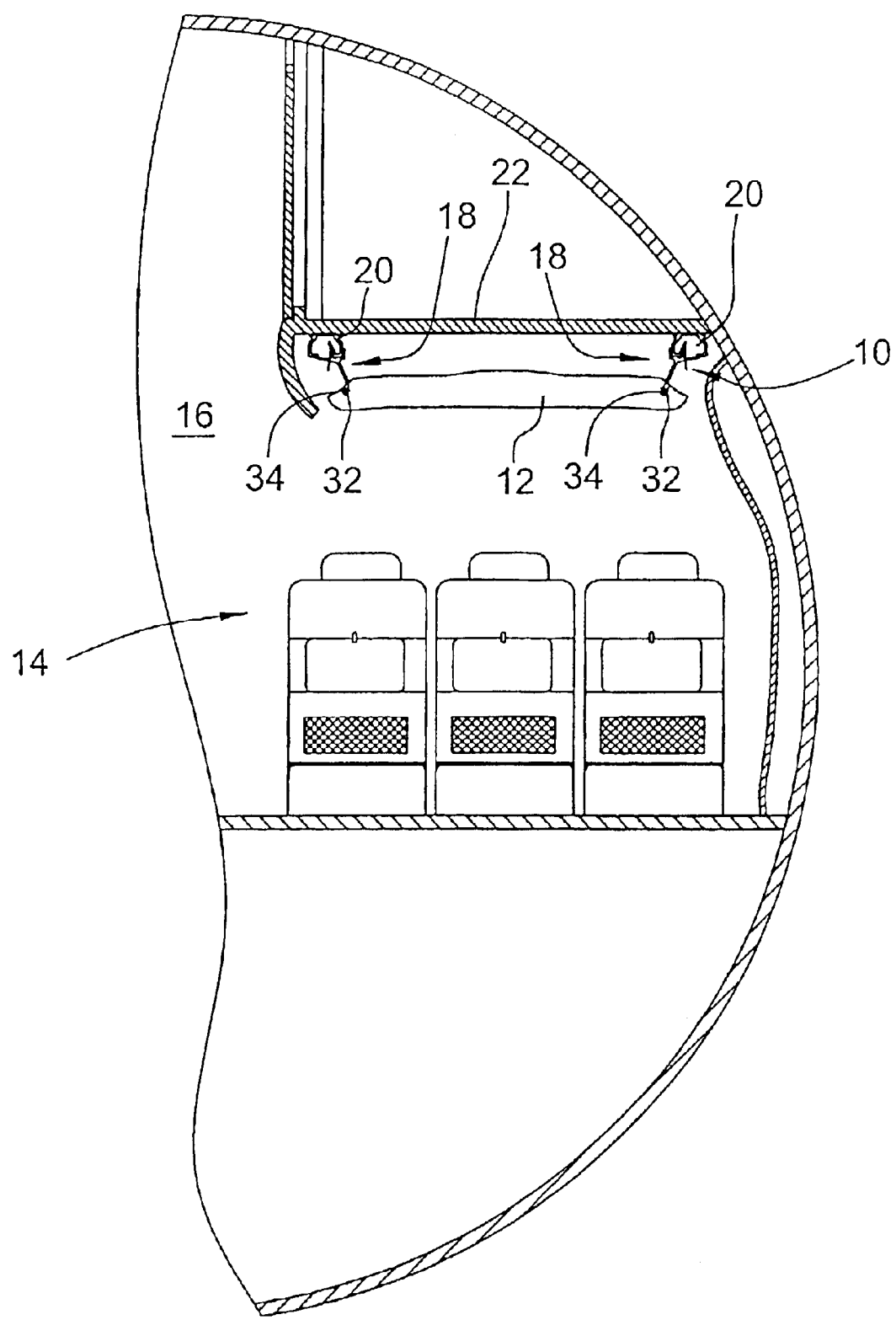
FIG. 1 is a sectional partial view of the fuselage of an airplane for illustrating the site in the passenger cabin where the inventive device is used.

FIG. 1 is illustrative of the application of the inventive device 10 for attachment of a covering element 12 above a seat row 14 in the passenger cabin 16 of an airplane. For this purpose, a plurality of fastening elements 18 are each connected, on the one hand, to the covering element 12 and, on the other hand, to C-shaped mounting profiles 20 which in turn are fixedly attached to holding structure elements 22 of the plane's passenger cabin 16. The construction and the operation of the fastening elements 18 will be explained hereunder with reference to FIGS. 2 to 4.

Figure 2:
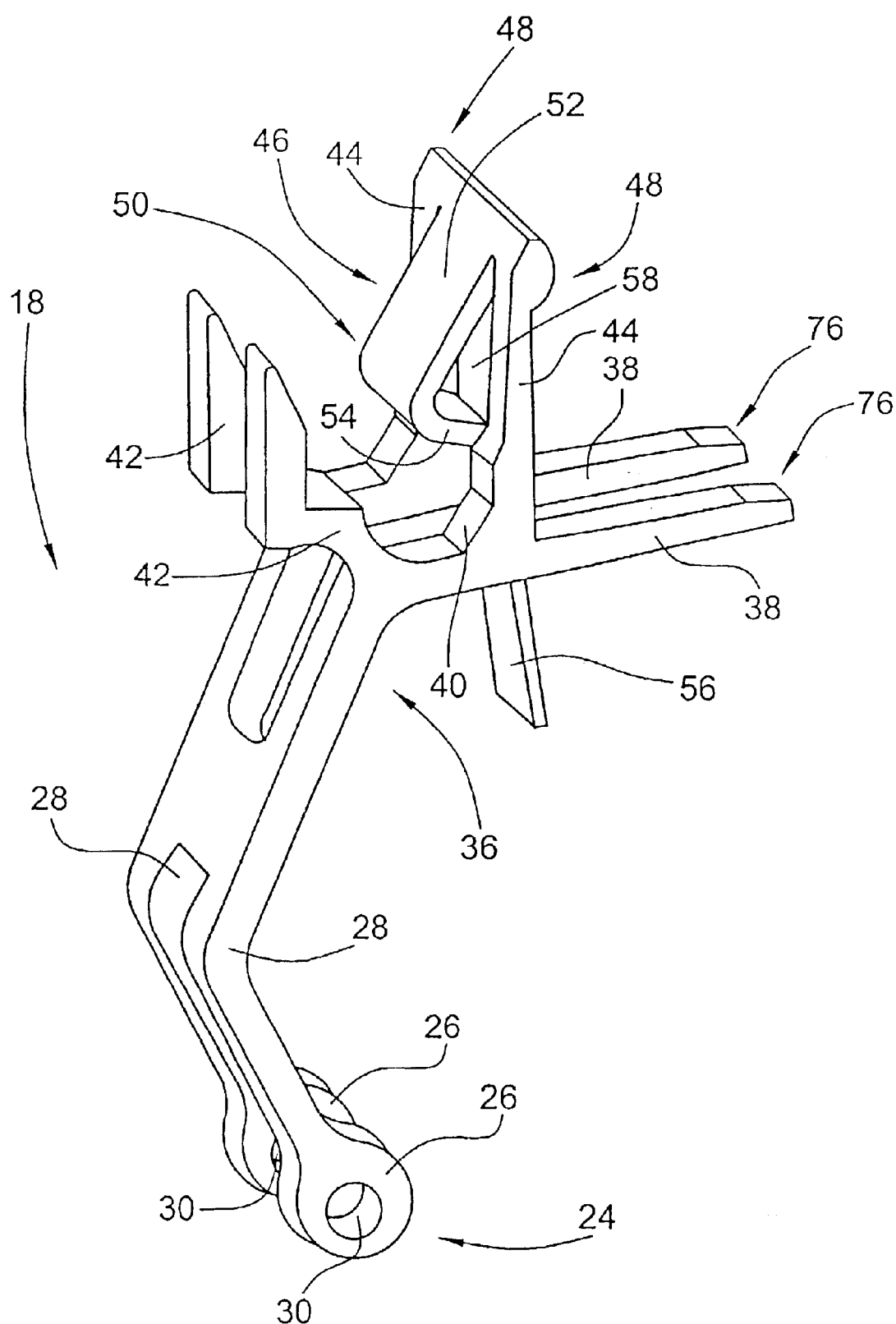
FIG. 2 is a perspective view of a fastening element of the inventive device.

The configuration of fastening element 18 is illustrated in the perspective view of FIG. 2. As shown, the one-pieced fastening element 18 comprises a first end 24 which is formed by the ends 26 of two web portions 28. The two ends 26 of these web portions 28 comprise mutually aligned openings 30 having a pin 32 extending therethrough (see also FIG. 1 and particularly FIGS. 3 and 4), which pin further extends through aligned openings 34 in the covering element 21.

The second end of fastening element 18 is provided, at its second end 36 opposite the first end 24, with two abutment portions 38 joining the web portions 28 and being formed in the manner of fingers. Arranged between the two web-shaped abutment portions 38 and the web portions 28 is a plate portion 40 with two grip-around portions 42 extending therefrom. These grip-around portions 42 extend from the plate portion 40 in directions opposite to the orientation of the web portions 28 and are arranged to project over the side of the web portions 28 opposite the abutment portions 38.

In the transition region between the plate portion 40 and the abutment portion 38, both portions have two holding portions 44 extending therefrom which are arranged substantially in parallel to the grip-around portions 42. The two holding portions 44, likewise formed in the manner of arms, hold a locking portion 46 therebetween which on the ends 48 of the holding portions 44 facing away from the abutment portions 38 and the plate portion 40 is integrally connected to these ends. The locking portion 46 is provided with a locking projection 50 which comprises a first flank face 52 connected to the holding portion ends 48 and a second flank face 54 extending substantially at a right angle to the first flank face. While these two flank faces 52, 54 extends towards a first common side of the two holding portions 44, the second flank face 54 on the other side of the holding portions 44 is joined by an actuating portion 56 formed in the manner of a flap, extending between the two abutment portions 38 and projecting beyond these portions towards the first end 24 of fastening element 18.

The whole fastening element 18 according to FIG. 2 is produced from plastic and in one piece, e.g. through injection-molding technology. Due to the selected materials, the locking portion 46 is connected to the holding portions 44 in a flexible manner. In FIG. 2, the locking projection 50 of locking portion 46 extends through an opening 58, formed between the holding portions 44, in the direction of the grip-around portions 42. This is the rest position of fastening element 18 which is also the locking position, as will be explained hereunder with reference to FIGS. 3 and 4. By moving the actuating portion 56 away from the web portions 28, the locking projection 50 can be moved to the holding portions 44 and thus through the opening 58, notably up to the release position (see FIG. 4).

The cooperation between the fastening elements 18 and the C-shaped mounting profile 20 will now be explained with reference to FIGS. 3 and 4. The mounting profile 20 is made e.g. from metal and comprises two L-shaped elements 60 each having a first leg 62 and a shorter second leg 64 arranged substantially at a right angle to the first leg. The two L-shaped elements 60 are integrally connected to each other by a base leg 66. This configuration combines to form the C-shaped mounting profile 20.

Figure 3:
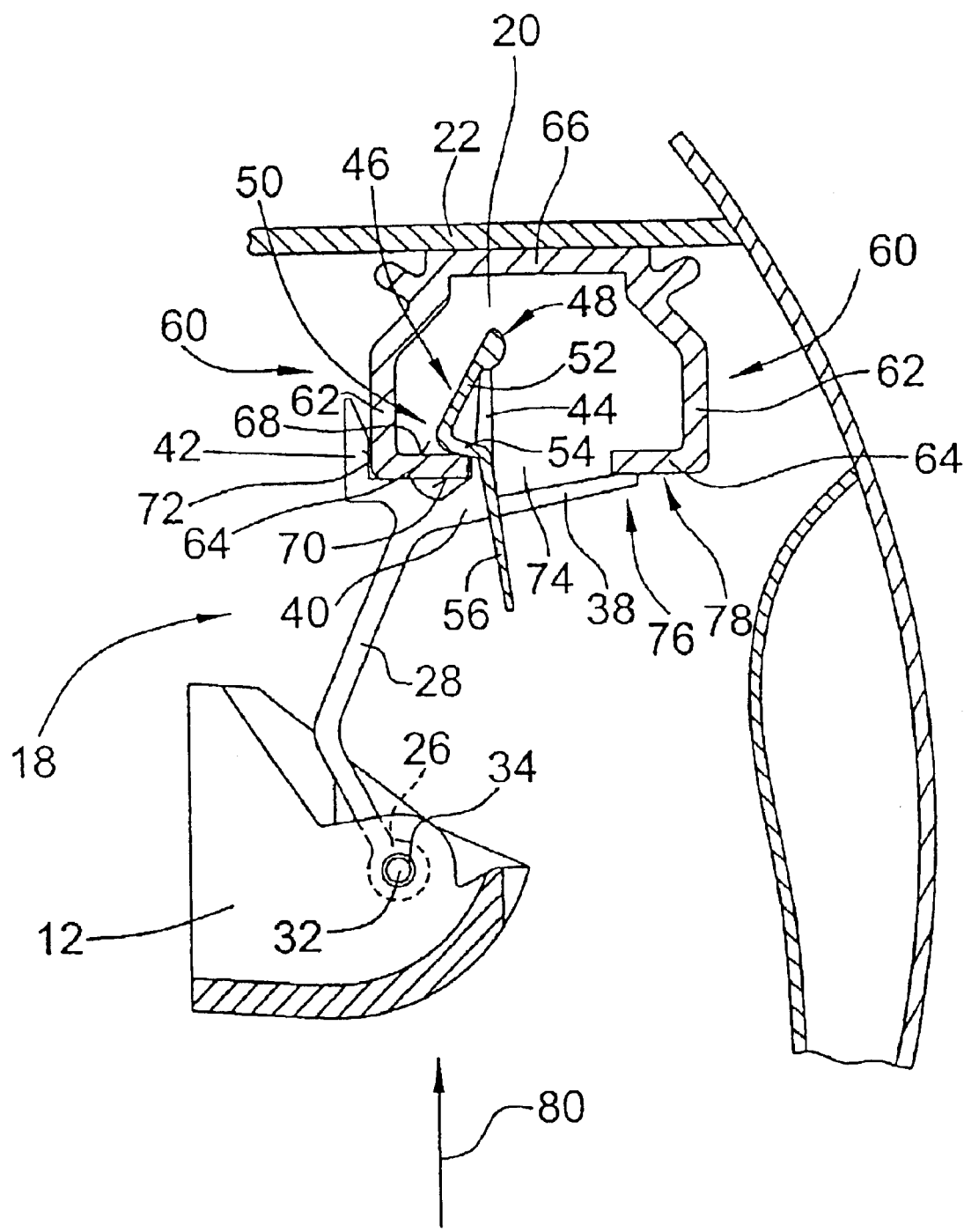
FIG. 3 is an enlarged view of a detail according to III in FIG. 1, showing the fastening element in its locking position.
Figure 4:
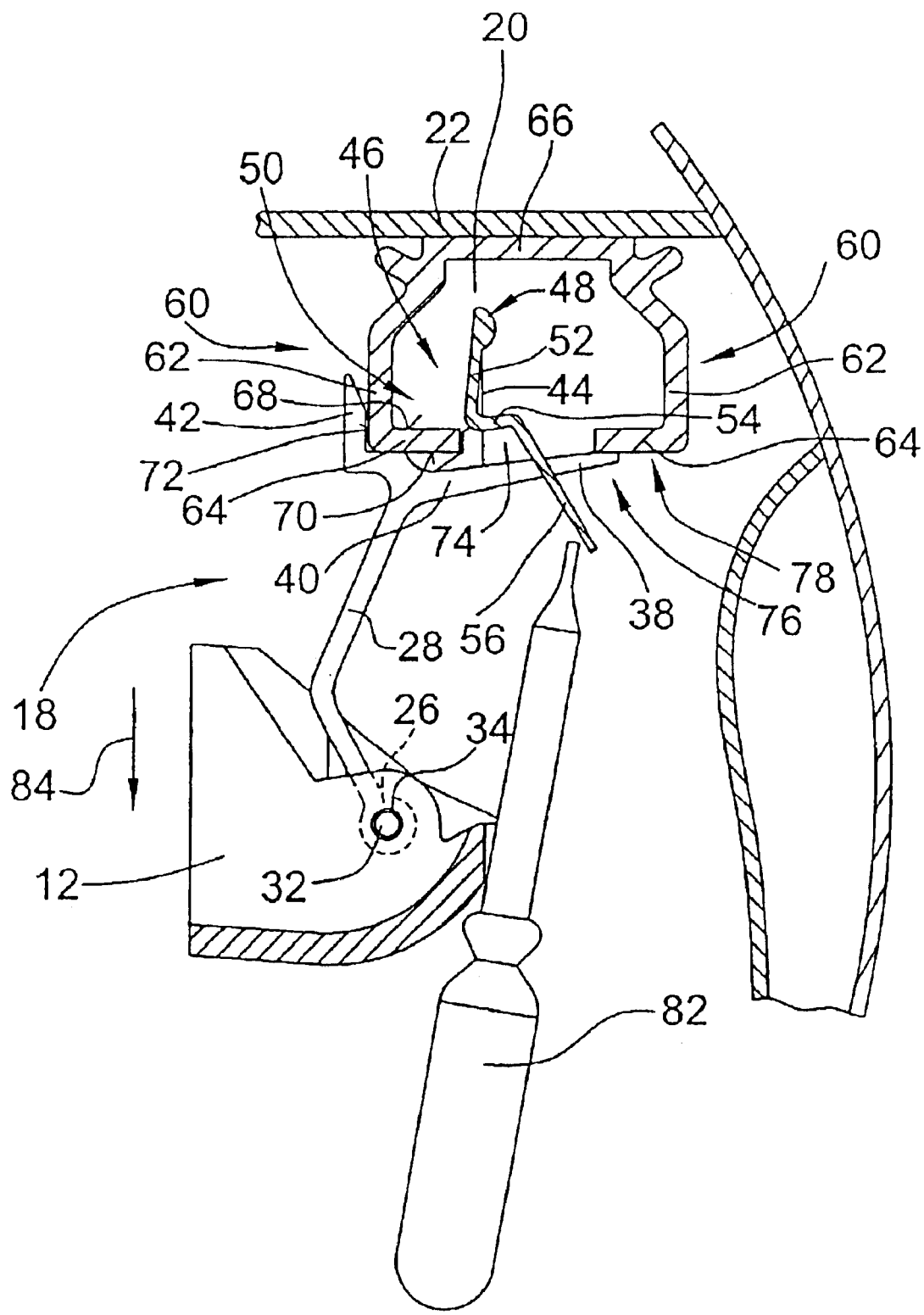
FIG. 4 is a view of the situation similar to that according to FIG. 3 but in the condition in which the fastening element has been transferred by use of a tool into its release position.

According to FIG. 3, this mounting profile 20 has the fastening elements 18 locked thereto, as shown in FIG. 3. As illustrated, the grip-around portions 42 and the locking portion 46 exert a two-sided grip around one of the two L-shaped elements 60, the locking projection 50 being supported on the inner side 68 of the second leg 64. Arranged in abutment on the outer side 70 of this second leg 64 are the grip-around portions 42 which are also arranged in abutment on the outer side 72 of the first leg 62 of the respective L-shaped element 60. The abutment portions 38 are arranged to bridge the opening 74 between the second legs 64 of the two L-shaped elements 60 and by their free ends 76 are supported on the outer side of the second leg 64 of the L-shaped element 60 which is not gripped by the grip-around portions 42 and the locking portion 46. Thus, this leg 64 functions as a supporting element 78 for the abutment portions 38.

By inserting the fastening element 18 in the direction of arrow 80 in FIG. 3, the locking projections 50 will automatically enter the locking position shown in FIG. 3. In the first phase of the insertion process, the locking projection 50 is moved, by the flank face 52 contacting the free end of the leg 64 of L-shaped element 60, into the release position until the first flank face 52 of locking projection 50 has moved beyond the first leg 64. As a result of the restoring force, the locking projection 50 will then automatically snap back into its locking position shown in FIG. 3, whereby the fastening element 18 will be locked while generating a snap-in sound.

Now, by use of a tool such as e.g. a screw driver 82, the locking projection 50 can be moved from the constellation according to FIG. 3 into its release position. This is shown in FIG. 4. By means of the screw driver 82, the actuating portion 56 is moved in the direction towards the free ends 76 of the abutment portions 38 and thus in the direction of that L-shaped element 60 which is not gripped by the locking portion 46 and the grip-around portions 42. FIG. 4 illustrates how, in this manner, the locking projection 50 can be moved out of engagement with the second leg of the—in FIG. 4—left L-shaped element 60 of the C-shaped mounting profile 20. In this condition, the fastening element 18 and the covering element 12, respectively, can be moved in the direction of arrow 84 out of the C-shaped mounting profile 20.

Although the invention has been described and illustrated with reference to specific illustrative embodiments thereof, it is not intended that the invention be limited to those illustrative embodiments. Those skilled in the art will recognize that variations and modifications can be made without departing from the true scope of the invention as defined by the claims that follow. It is therefore intended to include within the invention all such variations and modifications as fall within the scope of the appended claims and equivalents thereof.

What is claimed is:

1. A device for removably fastening a first part to a second part installed in a vehicle and comprising an L-shaped element including a first leg and a second leg extending therefrom substantially at a right angle and having a free end, and further comprising a support element arranged in the extension of the second leg and at a distance from the free end of the second leg, the second part being formed particularly as a C-shaped mounting profile, the device comprising a fastening element having a first end for attachment to the first part and a second end for attachment to the second part, wherein the second end of the fastening element is provided with
- an abutment portion for abutment on the second leg and the support element of the second part,
- a locking portion to be locked to the free end of the second leg of the second part, the locking portion being flexible and adapted to be moved from a locking position into a release position, thereby generating a restoring force,
- an actuating portion for manually moving the locking portion from the locking position to the release position thereof, and
- a grip-around portion for gripping around the second part in the transition region of the two legs.

2. The device according to claim 1, wherein the locking portion is held by a holding portion arranged to extend from the abutment portion, and that the actuating portion is formed as an extension of the locking portion and projects beyond the abutment portion on the side facing away from the holding portion.

3. The device according to claim 1, wherein the grip-around portion extends from the abutment portion.

4. The device according to claim 1, wherein the abutment portion near the grip-around portion has a web portion extending therefrom, the web portion facing away from the grip-around portion and having its free end forming the first end of the fastening element.

5. The device according to claim 1, wherein two web-like abutment portions with at least one projecting grip-around portion and a projecting holding portion are provided, and that the locking portion is arranged between the two holding portions and is flexibly connected thereto.

6. The device according to claims 4, wherein each abutment portion has a web portion extending therefrom.

7. The device according to claim 6, wherein the locking portion comprises a locking projection having a first flank face arranged at an acute angle to the holding portion, and a second flank face arranged at an angle to the first flank face, and that the actuating portion angularly joins the second flank face of the locking projection.

8. The device according to claim 1, wherein the fastening element comprises synthetic material.

* * * * *